US007779733B1

(12) United States Patent
Dumback

(10) Patent No.: US 7,779,733 B1
(45) Date of Patent: Aug. 24, 2010

(54) GLOW PLUG REMOVAL METHOD

(75) Inventor: Christopher F. Dumback, Scranton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 13 days.

(21) Appl. No.: 12/287,160

(22) Filed: Oct. 2, 2008

Related U.S. Application Data

(63) Continuation-in-part of application No. 11/357,457, filed on Feb. 15, 2006, now abandoned.

(51) Int. Cl.
*B25B 7/02* (2006.01)
*B23P 19/00* (2006.01)

(52) U.S. Cl. ........................................ 81/420; 29/426.1

(58) Field of Classification Search .................. 81/420, 81/418, 424.5, 426.5, 427.5; 29/426.1, 426.5
See application file for complete search history.

(56) References Cited

U.S. PATENT DOCUMENTS 4,318,316 A * 3/1982 Guilliams .................. 81/426.5
5,193,336 A * 3/1993 King ......................... 81/426.5
5,611,519 A * 3/1997 Garcia ....................... 81/426.5
6,427,303 B1 8/2002 McConnell et al.
6,487,942 B1 * 12/2002 Carter et al. ............... 81/426.5
6,584,662 B1 7/2003 Krick
2003/0172782 A1 * 9/2003 Saunders ..................... 81/119

* cited by examiner

*Primary Examiner*—Hadi Shakeri
(74) *Attorney, Agent, or Firm*—Michael Zelenka; Stephen J. Harbulak

(57) ABSTRACT

A method of removing a glow plug from a combustion engine utilizing a hand tool includeing two interconnected arms each being movable with respect to one another and each having a working end and an opposing handle portion. The hand tool may further include an extension body that has a generally tubular configuration. The extension body may have a first body portion and a second body portion wherein the first body portion extends from one of the interconnected arms and wherein the second body portion extends from the other of the interconnected arms and wherein each of the first body portion and the second body portion includes an interior surface that is threaded.

7 Claims, 3 Drawing Sheets

GLOW PLUG REMOVAL METHOD

CONTINUATION-IN-PART

This application is a Continuation-In-Part of U.S. Patent And Trademark Office application Ser. No. 11/357,457, entitled, "Glow Plug Puller," which was filed on Feb. 15, 2006, by the same inventor herein, and is about to be abandoned. This Continuation-In-Part is being filed under 35 USC §120and 37 CFR §1.53, and priority from that application is hereby claimed.

GOVERNMENT INTEREST

The invention described herein may be manufactured, used, imported, sold, and licensed by or for the Government of the United States of America without the payment of any royalty thereon or there for.

BACKGROUND OF THE INVENTION

1. Field of the Invention

The present invention relates generally to hand tools and, more particularly, to hand tools for facilitating the removal of items from confined locations.

2. Related Art

Various hand tools for extracting a swollen or bent glow plug from a diesel combustion engine are currently available. For example, U.S. Pat. No. 6,584,662 describes an extractor tool that has an externally threaded shaft, an internally threaded sleeve that engages the externally threaded shaft, and a fixed cavity formed in one end of the externally threaded shaft. The cavity has a side entry to permit the insertion of the glow plug into the cavity in a direction normal to the shaft and a pair of opposing shoulders integrally formed in opposing sidewalls of the cavity to engage the glow plug. The sleeve threads down the shaft until it contacts the engine block. Rotating the sleeve exerts a pulling force on the shaft, which is transferred to the inserted glow plug by the opposing shoulders in the cavity. This pulls both the shaft and the inserted glow plug away from the engine block.

U.S. Pat. No. 6,427,303 describes a glow plug pulling device that includes an elongate shaft having a threaded inner end portion and a smooth outer end portion. The smooth outer end portion has a hammer stop fixedly secured thereto. A collet is coupled with respect to the threaded inner end portion of the elongated shaft. The collet has an outer end having an internally threaded aperture for coupling with the threaded inner end portion of the elongated shaft. The collet has a hex shaped open inner end for engaging the hex shaped outer free end of the glow plug. The collet has a compression sleeve secured thereto intermediate the outer end and inner end thereof. A slide hammer is slidably disposed on the smooth outer end portion of the elongated shaft. The slide hammer has an open inner end dimensioned for receiving and engaging the compression sleeve of the collet therein. The slide hammer has a knurled outer surface.

Both of these prior art hand tools are complex, difficult to operate and time consuming to utilize. Moreover, both require the user to exert a pulling force to pull the glow plug from the diesel engine. However, a pulling force may be counter-productive when portions of the glow plug are stuck in the diesel engine because the heating element is swollen, bent or broken. Thus, prior art glow plug pullers will often bend or break the misshaped glow plug heating element which requires more time-consuming and costly removal operations or even damage to the diesel engine. Accordingly, it is an object of the present invention to ameliorate these and other shortcomings, limitations, problems, and difficulties presented by use of current glow plug puller devices with an easier to use glow plug removal tool.

SUMMARY OF THE INVENTION

In order to answer the long-felt need for a glow plug removal tool that does not suffer from the shortcomings, limitations, problems, and difficulties of prior art glow plug pullers, the present invention provides a glow plug removal tool that advantageously allows the user to more easily remove a bent, broken, or misshapen glow plug heating element from a diesel engine. The present invention's hand tool avoids the costly and time-consuming replacement and repair procedures required because of the damage to the glow plug port and diesel engine often caused by prior art glow plug pullers. The present invention is a hand tool for removing a glow plug from a combustion engine comprising two interconnected arms, each being movable with respect to one another and having a working end and an opposing handle portion. The hand tool may further comprise an extension body that has a generally tubular configuration. The extension body includes a first body portion and a second body portion wherein the first body portion extends from one of the interconnected arms and the second body portion'extends from the other of the interconnected arms with the first body portion and the second body portion having opposing threaded inner surfaces that extend threading in the glow plug port of the diesel engine in such a way that glow plug threads spin out of the glow plug port much more easily.

BRIEF DESCRIPTION OF THE DRAWINGS

The following detailed description is made with reference to the accompanying drawings, in which.

DETAILED DESCRIPTION OF THE DRAWINGS

One embodiment of the present invention concerns a hand tool for facilitating the removal of a stuck diesel engine glow plug. The hand tool may advantageously comprise a locking-type of pliers that has a working end with a tubular shaped, threaded, extension body mounted thereon. The hand tool may be operated, for example, to form around, and thereafter facilitate the removal of a glow plug that has a swollen or bent end that is stuck in a glow plug port of a diesel combustion engine.

Figure 1:
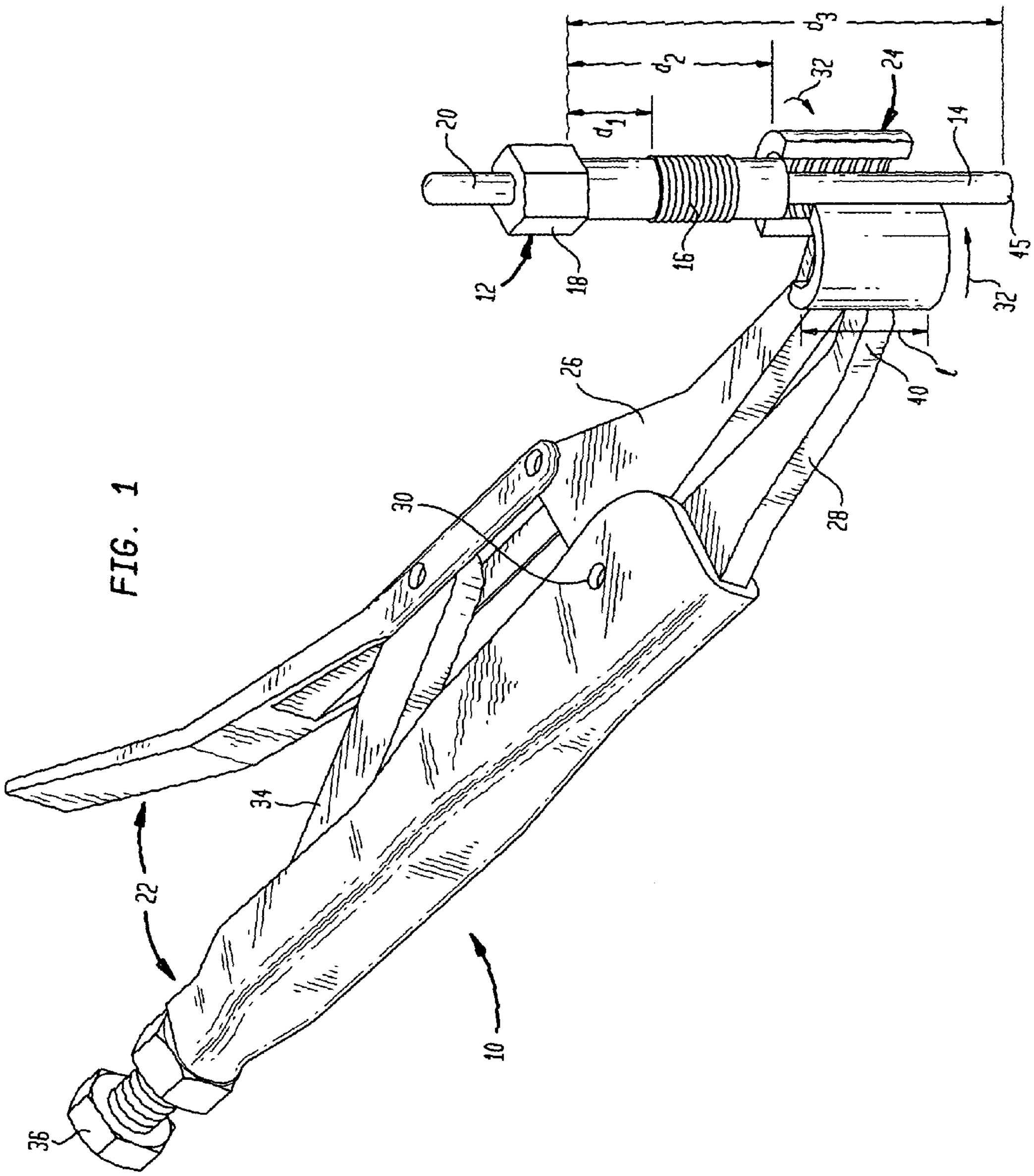
FIG. 1 is a perspective view of a hand tool in accordance with an embodiment of the present invention and a diesel engine glow plug.
Figure 4:
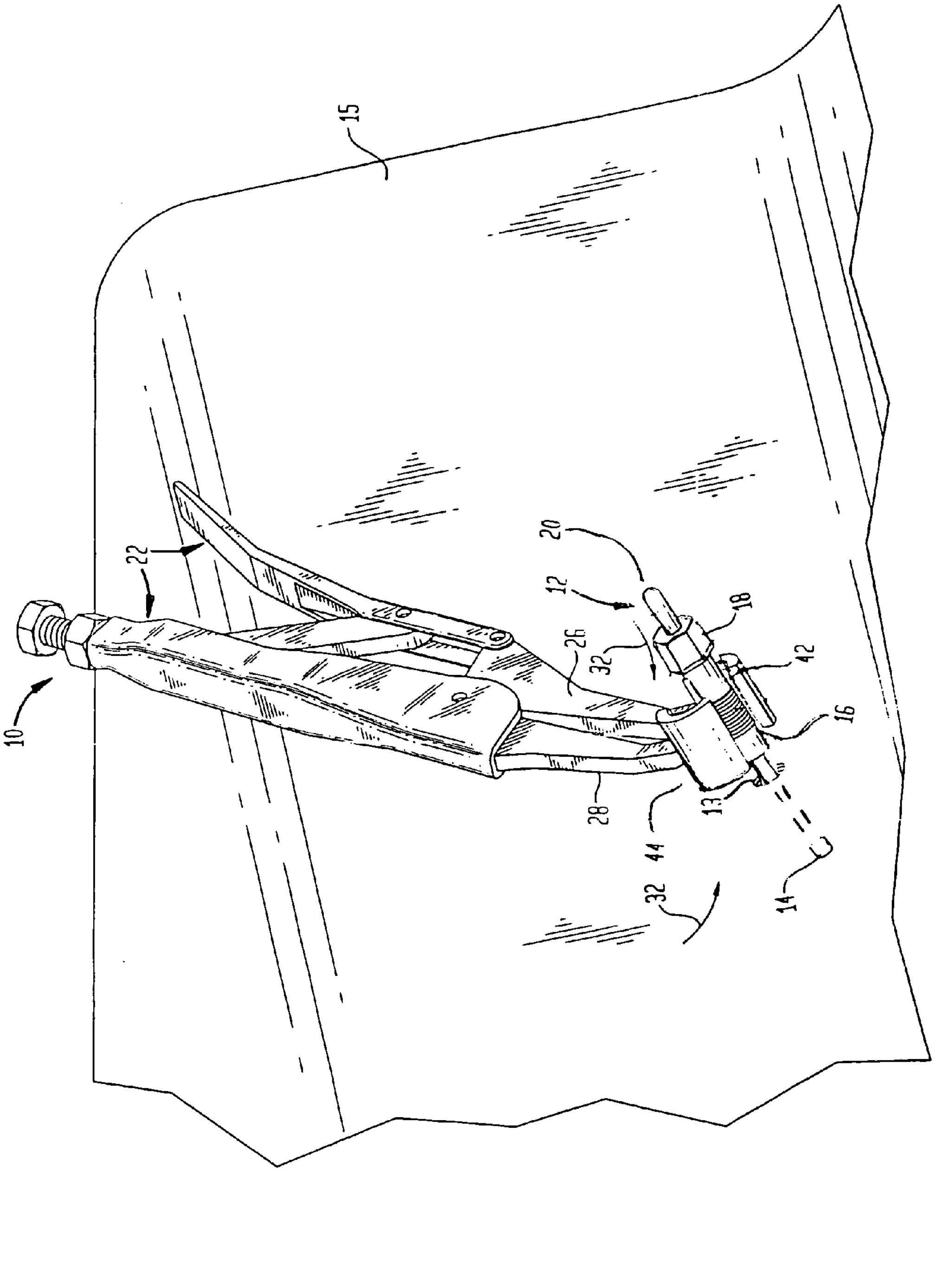
FIG. 4 is an exploded, perspective view showing operation of the FIG. 1 hand tool to remove a diesel engine glow plug from a port of a diesel engine.

Referring now to FIGS. 1 and 4, a hand tool, in accordance with one embodiment of the present invention, is illustrated generally at 10. The hand tool 10 is shown with an exemplary work piece, that is, glow plug 12. The glow plug 12 comprises a heating element 14, mounting threads 16, hex nut 18 and an electrical connector 20. The hand tool 10 is particularly useful in connection with the removal of a glow plug 12 where the heating element 14 has swelled or bent (not shown) such that it is incapable of easily being pulled out by hand through a narrow glow plug port 13 of a diesel combustion engine 15. It is in such circumstances that prior art glow plug pullers may cause costly repairs or damage to the diesel engine.

Figure 2:
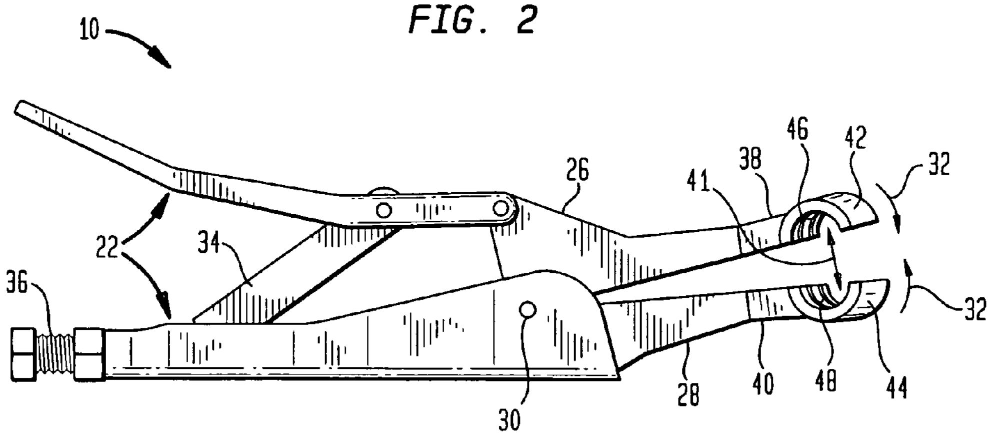
FIG. 2 is a top view of the FIG. 1 hand tool.

In this embodiment and referring now to FIGS. 1 and 2, the hand tool 10 generally comprises, at one end, a handle portion 22 and, at the opposing end, a working portion 24.

The handle portion 22 may be composed of a suitably strong and durable material such as a metallic substance and may comprise arms 26 and 28 that may be interconnected together via a pin 30 to provide movement in the direction of arrows 32 at the working portion 24. While means to achieve the foregoing function is preferably a locking-type of pliers, which may be similar to that sold under the term VISE-GRIPS, it will be understood that the arms 26 and 28 may be configured in any suitable manner to achieve this function, such as any generally available non-locking type of pliers. As shown, arm 26 is articulated and connected to the arm 28 by the pin 30 and a movable member 34. A screw member 36 is provided for adjusting a pinching force provided in the direction of arrows 32.

Figure 3:
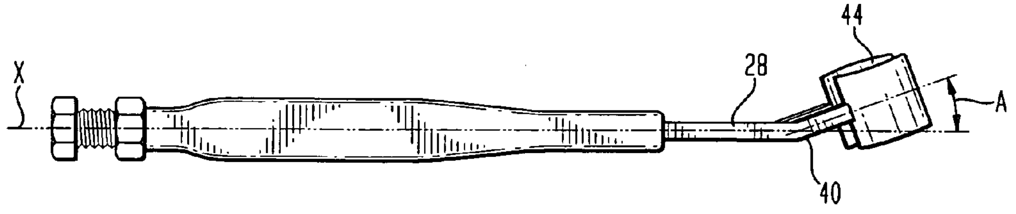
FIG. 3 is a side view of the FIG. 1 hand tool.

Referring now also to FIG. 3, extending from each arm 26 and 28 may be angled portions 38 and 40 which may extend at an acute angle A that may be approximately 35 degrees to a longitudinal axis x of the arms 26 and 28. For ease of illustration, only the longitudinal axis x of the arm 28 is shown. Angle A may be in the range of between approximately 1 degree and approximately 60 degrees depending upon the required application taking into account the pathway available to the workpiece.

Referring back now to FIGS. 1 and 2, the working portion or extension body 24 may be composed of any suitably strong and durable material such as a metallic substance, and may also have a generally tubular configuration defining a generally cylindrical cavity 41 when arms 26 and 28 are squeezed together. As best seen in FIG. 2, the extension body 24 may comprise a first body portion 42 and a second body portion 44, each of which extend from a respective angled portion 38 and 40. The first body portion 42 and the second body portion 44 may each comprise a generally semi-cylindrical configuration, although, it will be appreciated that together the body portions 42 and 44 may not form a complete cylinder, or that one or the other may comprise a greater peripheral portion of a cylinder than one-half. For example, both body portions may together only cover about 90% of the periphery of a cylinder or one body portion may cover 75% of the periphery of a cylinder with the other covering the other approximately 25%.

In accordance with another feature of the present embodiment, each body portion 42 and 44 comprises a threaded inner surface 46 and 48 (FIG. 2) for providing an extension of the threads 16 of the port 13 (FIG. 4) wherefrom a glow plug 12 may be extracted. Accordingly, it will be appreciated that the threaded inner surfaces 46 and 48 depicted in FIG. 2 should correspond to that of the threads 16 of glow plug 12 and those of the port 13.

As best seen in FIGS. 1 and 3, each body portion 42 (hidden in FIG. 3) and 44 may comprise a minimum length l which may be found by the following equation:

$$l=(d_3-d_2)-d_1$$

where: $d_1$, $d_2$, and $d_3$ are measured along the glow plug 12 as shown in FIG. 1, particularly, where $d_1$ is a distance from the glow plug threads 16 to the hex nut 18 of the glow plug 12, $d_2$ is a distance of an enlarged diametrical portion (not numbered) of the glow plug 12, and $d_3$ is a distance of the enlarged diametrical portion of the glow plug 12 together with a distance of the heating element 14. It will be appreciated that such a minimum length l will provide that the terminal end of the heating element 14 will be extracted a sufficient distance to an enlarged diametrical portion of the glow plug port 13 to be either removed by hand or with another suitable tool such as a wrench or pair of pliers.

In operation, and as best seen in FIG. 4, a glow plug 12 may be removed from the port 13 of the diesel engine 15 by first unscrewing the glow plug 12 until glow plug threads 16 have completely exited the port 13. At this time, it will be noted that where the heating element 14 has swelled or bent, further rotation of the glow plug 12 fails to produce additional separation of the glow plug from the port 13. In accordance with the present invention, opposing threaded inner surfaces 46 and 48 (FIG. 2) of the extension body 24 extend the threading of the port 13 in such a way that the glow plug threads 16 will spin easily within the hand tool 10. The hand tool 10 now may be advantageously maneuvered into position in order to locate the extension body 24 about the threads 16 of the glow plug 12 and in position to provide additional threading of the opposing threaded inner surfaces 46 and 48 to that of the port 13. To achieve this, the handle portion 22 may be squeezed by hand, forcing arms 26 and 28 together, in the direction of arrows 32 and, in turn, first and second body portions 42 and 44 together to form the extension body 24 and engage the threads 16 of glow plug 12. Once the opposing threaded inner surfaces 46 and 48 of the extension body 24 and the glow plug threads 16 properly mesh, the extension body 24 is positioned against the diesel engine 15 for additional leverage. The cooperation of the opposing threaded inner surfaces 46 and 48; glow plug threads 16, and leverage of the extension body 24 against the diesel engine 15 allows the glow plug threads 16 to spin freely within the hand tool 10 so that the glow plug 12 may be further rotated, via a socket wrench or the like (not shown), whereby the glow plug 12 may be completely extracted from the port 13 despite the heating element 14 being swollen or bent without the glow plug 12 being broken or grabbed-to-pull, thereby preventing damage to the diesel engine 15. Those skilled in the art will readily see that another advantage of this invention's hand tool 10 over prior art arrangements is that extension arms 24 and 25, and body portions 42 and 44 are formed as a single integral piece and that there are no small or loose parts that can break or fall into the engine block during the glow plug removal operation.

While the present invention has been described in connection with what are presently considered to be the most practical and preferred embodiments, it is to be understood that the present invention is not limited to these herein disclosed embodiments. It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

What I claim is:

1. A method for removing a glow plug having a set of glow plug threads from a threaded glow plug port of a diesel engine, said method comprising the steps of:

providing a hand tool, said hand tool including a handle portion and a working portion; said handle portion further comprising a pair of interconnected arms; an angled portion extends from each of said interconnected arms; a first body portion extends from a one of said angled portions and a second body portion extends from a second one of said angled portions; said first body portion having a generally semi-cylindrical configuration and a first threaded inner surface, and said second body portion having a generally semi-cylindrical configuration and a second threaded inner surface; said pair of interconnected arms being compressed to cause said first body portion and said second body portion to mate cylindrically and form an extension body, said extension body having a generally tubular configuration that defines a generally cylindrical cavity; said extension body, being positioned against said diesel engine, provides the user with an amount of additional leverage; said extension body causing said threaded inner surfaces to engage said set of glow plug threads when said glow plug is partially removed from said glow plug port; said threaded inner surfaces correspond to said threaded glow plug port; said threaded inner surfaces being dimensioned to provide a threaded extension of said threaded glow plug port;

unscrewing the glow plug until the set of glow plug threads has substantially exited the port;

positioning the hand tool as to locate the extension body about the threads of the glow plug and in position to provide additional threading of the opposing threaded inner surfaces to that of the port;

positioning the extension body against the diesel engine for additional leverage;

freely spinning the glow plug threads within the hand tool so that the glow plug can be further rotated; and extracting the glow plug from the port without damage to the glow plug, the glow plug threads, the threaded glow plug port, and the diesel engine.

2. The method for removing the glow plug having the set of glow plug threads from the threaded glow plug port of the diesel engine, as recited in claim 1, wherein said angled portion is located between said opposing handle portion and said working portion; and said angled portion extends at an acute angle A from a longitudinal axis x of each of said interconnected arms.

3. The method for removing the glow plug having the set of glow plug threads from the threaded glow plug port of the diesel engine, as recited in claim 2, wherein said acute angle A is in a range of between about 1 degree and about 60 degrees.

4. The method for removing the glow plug having the set of glow plug threads from the threaded glow plug port of the diesel engine, as recited in claim 3, wherein said acute angle A is approximately 35 degrees.

5. The method for removing the glow plug having the set of glow plug threads from the threaded glow plug port of the diesel engine, as recited in claim 4, wherein said pair of interconnected arms is a locking pliers.

6. The method for removing the glow plug having the set of glow plug threads from the threaded glow plug port of the diesel engine, as recited in claim 5, wherein a length (l) of said extension body is approximately equal to or greater than $(d_3-d_2)-d_1$, where said $d_1$is a distance from an end of said glow plug threads to a hex nut of said glow plug, said $d_2$ is a distance of an enlarged diametrical portion of said glow plug and- said $d_3$ is a distance of the enlarged diametrical portion of said glow plug together with a distance of a heating element of said glow plug.

7. The method for removing the glow plug having the set of glow plug threads from the threaded glow plug port of the diesel engine, as recited in claim 5, wherein a length (l) of said extension body is approximately equal to that dimension found by the formula:

$$l=(d_3-d_2)-d_1$$

where said $d_1$ is a distance from an end of said glow plug threads to a hex nut of said glow plug, said $d_2$ is a distance of an enlarged diametrical portion of said glow plug and said $d_3$ is a distance of the enlarged diametrical portion of said glow plug together with a distance of a heating element of said glow plug.

* * * * *